Sept. 17, 1963   J. E. MARTENS   3,104,130
CONTROL MECHANISM FOR RECLINING SEAT BACK
Filed Jan. 25, 1962   3 Sheets-Sheet 1

INVENTOR.
JACK E. MARTENS
BY Kenneth Walden
Boardman S. Mowry
ATTORNEY

Sept. 17, 1963     J. E. MARTENS     3,104,130
CONTROL MECHANISM FOR RECLINING SEAT BACK
Filed Jan. 25, 1962     3 Sheets-Sheet 2

INVENTOR.
JACK E. MARTENS
BY Kenneth E. Walden
Boardman S. Mowry
ATTORNEY

Sept. 17, 1963  J. E. MARTENS  3,104,130
CONTROL MECHANISM FOR RECLINING SEAT BACK
Filed Jan. 25, 1962  3 Sheets-Sheet 3

INVENTOR.
JACK E. MARTENS
BY Kenneth E. Walden
Boardman S. Mowry
ATTORNEY

United States Patent Office 3,104,130
Patented Sept. 17, 1963

1

3,104,130
CONTROL MECHANISM FOR RECLINING
SEAT BACK
Jack E. Martens, Gary, Ind., assignor to The Anderson Company, a corporation of Indiana
Filed Jan. 25, 1962, Ser. No. 168,785
3 Claims. (Cl. 297—355)

This invention relates to a positionable seat back and more particularly is directed to the framework and holding or positioning device therefor.

Attention is being given by the automotive industry to the backs of the front seat of an automobile wherein they may be reclined horizontally. It is also necessary in two-door automobiles to provide for pivotal movement of the back of the seat from an upright position to a forward position whereby passengers are admitted to or from the rear seat.

Therefore, an object of this invention is to provide the structure permitting the back of an automobile seat to be pivoted backward to a reclined position.

Another object of this invention is to provide structure permitting the back to be held in the upright position.

Another object of this invention is to provide for tilting of the back of the seat forward of the upright position to admit passengers into the back seat of a two-door automobile.

Another object of this invention is to provide a structure whereby the back of the seat pivots about one axis to the reclining position and about a second axis to the forward tilting position.

Another object of this invention is to provide for a tilting of the back inwardly as it is pivoted forward of its upright position.

Another object of this invention is to provide an improved holding mechanism to fixedly maintain the back of the seat in any desired position.

Other objects and advantages of the invention will become apparent after the description hereinafter set forth is considered in conjunction with the drawings annexed hereto.

In the drawings.

The structure shown in FIGURE 1 represents the front right-hand or passenger seat back of a two-door sedan automobile. The driver's seat back would have corresponding parts reversed as to position. Numeral 10 indicates generally the frame. The frame has a pair

Figures 2, 3, 4:
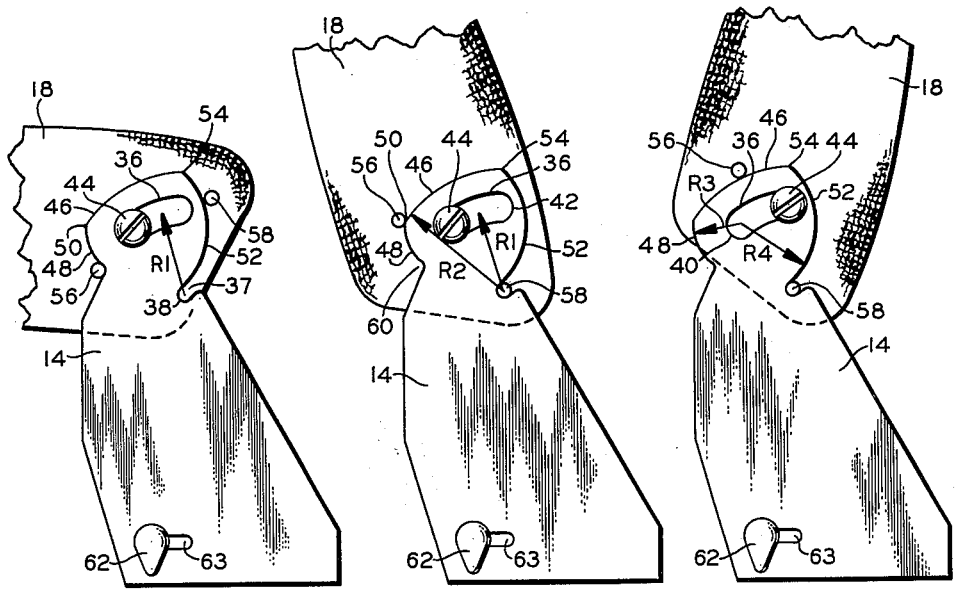
FIGURE 2 is a partial side view of the seat showing the side bracket and the back in reclined position.
FIGURE 3 is another partial side view of the seat showing the bracket and the back in upright position.
FIGURE 4 is another partial side view of the seat showing the bracket and the back in a forward tilted position.

2 of base portions 12, connected by bar 13, which are adaptable to be secured in position on the floor of an automobile. The inside portion of the frame has a vertical extension 12' which is provided with a pin 26 for cooperation with plate structure 24 to pivotally support back 18 at one side. The outside portion of frame 12, opposite frame portion 12', has secured thereto a side bracket 14 which includes a base portion 16. This bracket provides a plurality of pivotal supports for the back and which will be described more in detail later in this specification.

Back 18 is supported by a frame having upright side portions 20 (only one of which is shown) and a tie bar 22 across the bottom. A plate 24 is fixedly carried by one side of the frame 20 for pivotal movement about pin 26 which projects inwardly from frame 12'. A U-shaped bracket 28 is fixedly supported on the other side of frame 20 substantially opposite plate 24. Bracket 28 serves as a fastening means for one end of the positioning device to be more fully described, and supports a bolt or stud 44 projecting from the side thereof. Stud 44 of bracket 28 and aperture 32 of plate 24, disposed on opposite sides of frame 20, are axially aligned.

Figure 1:
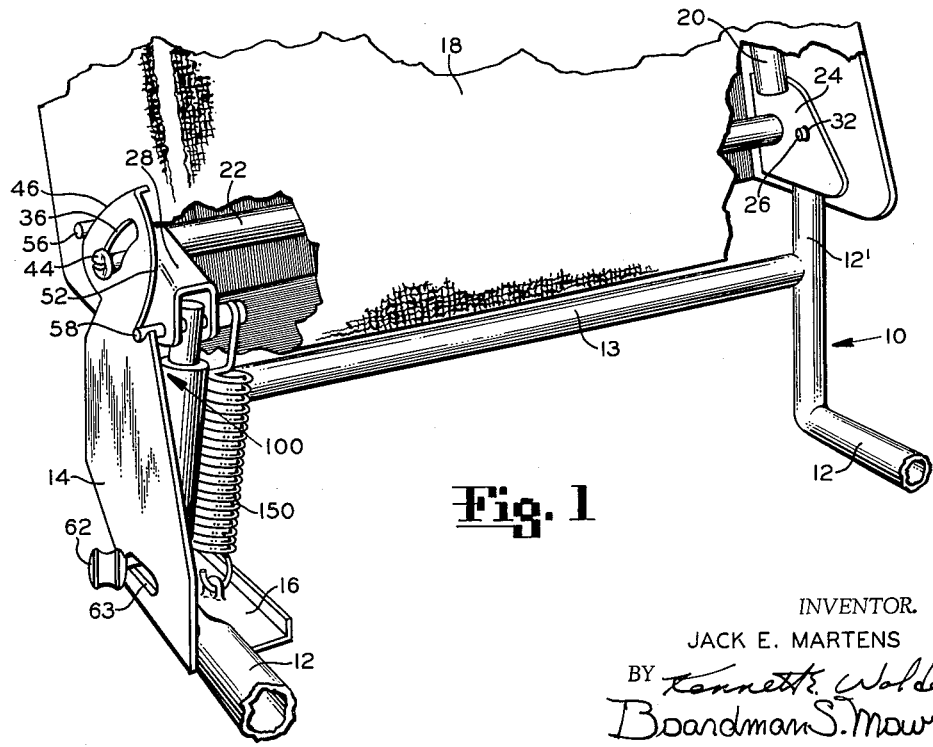
FIGURE 1 is an isometric front view, partly in section, of the supporting frame, pivoting mechanism and holding device.

Side bracket 14 is fixedly supported on one side of frame 12 in an upright position, as shown in FIGURE 1. The true dimensions and proportions of this bracket are fairly accurately shown in FIGURES 2, 3 and 4, setting forth its geometry.

Referring particularly to FIGURES 2, 3 and 4, an arcuate slot 36 is provided in the upper portion of bracket 14 and is further defined as being located along an arc described by the end of a radius R1 swinging about pivot point 37 near notch or shoulder 38 located on the forward edge of the bracket. Arcuate slot 36 terminates in ends 40 and 42, respectively, which limit the extent of arcuate travel of a bolt 44 therein. This bolt is fixed to the bracket 28, as most clearly shown in FIGURE 5, and projects through slot 36 and terminates in a head which retains the bolt in operative position within the slot. Bolt 44, as is evident from the disclosure in FIGURE 1, is also axially aligned with aperture 32 in plate 24 on the opposite side of frame 22.

Another arcuate surface 46 on the top edge of bracket 14 is described by the end of a radius R2 likewise swung about point 37, and is parallel with the arc of or edges of slot 36. Another arcuate surface 48, defining a rearward part of bracket 14, is described by the end of a radius R3 swung about the center of slot end 40. It can be seen that arcuate portions 46 and 48 meet at point 50 on bracket 14. A fourth arcuate surface 52 described by the end of a radius R4 swings about the center of slot end 40. It can be seen that the lower part of arcuate surface 52 terminates at shoulder 38 near the center of the radius describing the arcuate slot 36. Surfaces 46 and 52 form juncture 54 where they meet.

The U-shaped bracket 28 is fixed to frame 20 oppositely disposed from plate 24 and is adapted to move in close proximity to side bracket 14. As mentioned above, bolt 44 projects from one of the depending portions 28' of bracket 28 for operatively arcuate movement in slot 36. Shown isometrically in FIGURE 1 and in elevation in FIGURES 2 through 4, it is to be noted that studs 56 and 58 project from U bracket 28 parallel with bolt 44 in sliding proximity or contact with arcuate surfaces 48 and 52, respectively. Stud 58 extends through both depending portion or ears 28' of bracket 28 and provides means for pivotally fastening a positioning or holding device 100 thereto. This holding device will be described more fully later in the specification.

Assuming that the back 18 is in the normal position, as viewed in FIGURE 3, it can be seen that bolt 44 abuts slot end 40 in pivotal relation therewith and that stud 58 is received within shoulder 38 also in pivotal relation therewith. Also note that stud 56 is located adjacent intersection 50 of arcuate surfaces 46 and 48. Back 18 is movable to a reclined position by first releasing positioning mechanism 100 and pushing back 18 rearwardly or counterclockwise, as viewed in FIGURE 3. It can be seen that back 18, which carries bolt 44, will pivot about end 40 of slot 36 and that studs 56 and 58, positioned at a fixed distance from bolt 44, will move along surfaces 48 and 52, respectively, to the position shown in FIGURE 2. This is the reclined position for back 18 which is held in this position by the action of holding mechanism 100. Furthermore, it is to be noted that stud 56 bears against another notch or shoulder 60 at the lower portion of arcuate surface 48 to establish the limit of backward swinging movement or counterclockwise rotation (as seen in FIGURES 1–4) of the back 18 and to further hold the back in the reclined position. The back may, of course, be positioned anywhere between the extremes of FIGURES 2 and 3 and held from backward movement by holding mechanism 100.

Whenever it is desired to raise back 18 to the upright position, it is only necessary to move handle 62 forwardly in slot 63 of side plate 14 to thereby release the clutch mechanism of holding mechanism 100 whereupon back 18 will return by reason of spring 150 to the upright position of FIGURE 3. It can be seen that all pivotal movement will be between bolt 44 and end 40 of arcuate slot 36 and that this position is assured by reason of studs 56 and 58 sliding along arcuate surfaces 48 and 52, respectively.

Whenever stud 58 reaches shoulder 38, stud 56 is positioned at intersection 50 of arcuate surfaces 46 and 48. It will now be appreciated that forward or clockwise movement on back 18, as viewed in FIGURE 3, will cause back 18 to pivot forward about stud 58 bearing against shoulder 38 and that bolt 44 and stud 56 will move arcuately forward relative to slot 36 and arcuate surface 46 to the position shown in FIGURE 4. In this last-mentioned position, bolt 44 pivoting about stud 58 will come in contact with end 42 of the slot and prevent back 18 from moving forward beyond these limits. Back 18 is now in a position to admit passengers to or from a back of an automobile.

As pointed out previously in this specification, bolt 44 is axially and oppositely disposed from aperture 32 in plate 24. Therefore, it can be seen that as back 18 is moved rearwardly to the reclined position, all pivotal movement will take place along this axis. However, in the movement of the back 18 from the position of FIGURE 3 so that of FIGURE 4, it is pointed out that the pivotal movement is about the center of pin 58 or point 37 which is some distance below and forward of bolt 44 and opposite aperture 32. By this offsetting, it is apparent that back 18 will have an inward movement as it is pivoted forward about new pivot point 37. Stud 56 riding along arcuate surface 46 retains stud 58 in operative position against shoulder 38. Back 18 may be returned to the upright position of FIGURE 3 without any manipulation of handle 62 of holding mechanism 100. Release of holding mechanism 100 permits seat back 18 to be pivoted to the reclined position of FIGURE 2.

Figure 5:
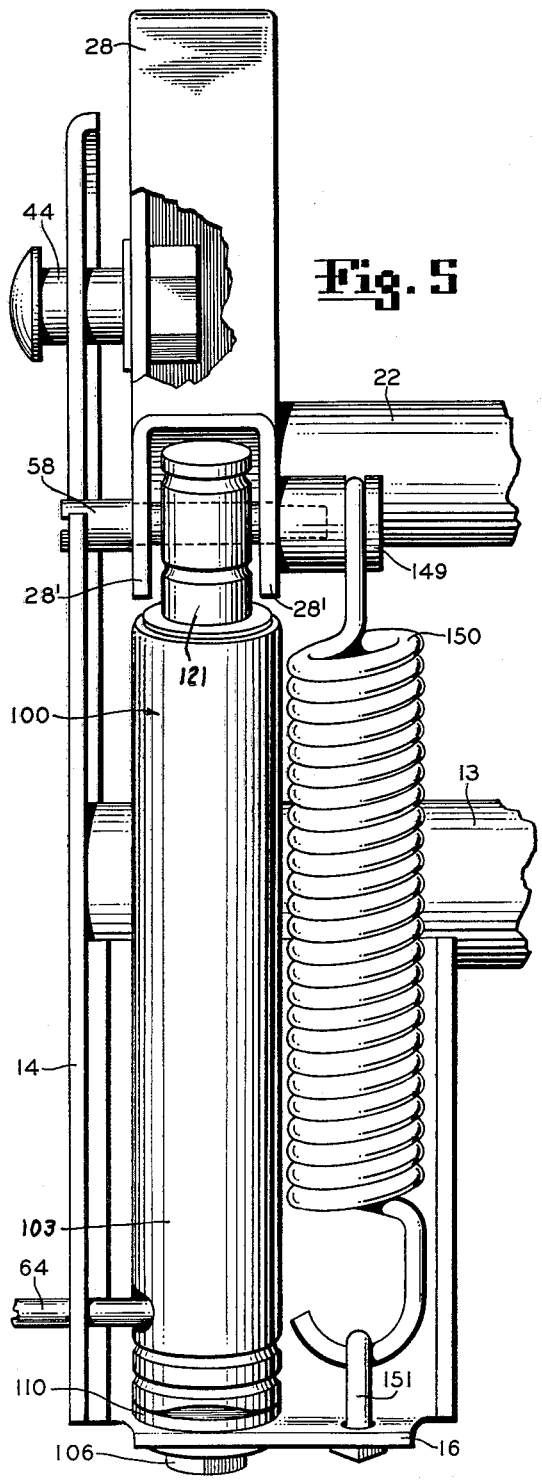
FIGURE 5 is an enlarged front view of the position-holding mechanism as shown in FIGURE 1.

A positioning or holding device, designated 100 in FIGURE 1, is operative between the frames of the seat and the back, respectively, to maintain the back in the desired position of angular adjustment. FIGURE 5 discloses in substantially full size the adjustor in position with the frames and shows how each end is anchored thereto.

The positioning device is provided with an internal mechanism which prevents the device from extending axially when a pull or force is applied in an axially extensible direction. The mechanism is adapted to permit retraction by a minimum force which is not resisted in any appreciable way by the internal mechanism. A release handle 62 on an arm 64 is operative to release the mechanism inside device 100 whereby axial force tending to extend or retract one element of the positioning device relative to another element will not be resisted. The operation of the positioning or holding device 100 will now be described in detail.

Figure 6:
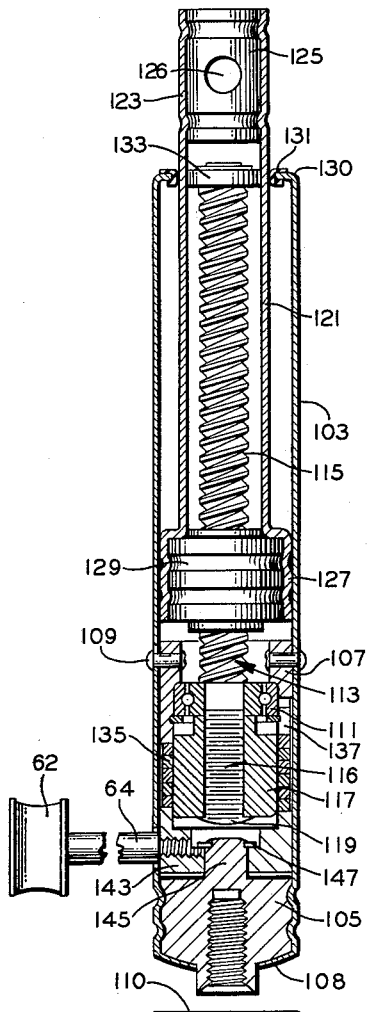
FIGURE 6 is a cross-sectional view of the position-holding mechanism of FIGURE 5.

Referring to FIGURE 6 for the details of the positioning mechanism, an outer tubular member 103 is fixedly provided at one end with a block 105 which is tapped to receive threaded nut 106 for fastening it to plate 16 of the seat frame. The end of the block 105 and tubular member 103 are spherical at 108 to provide for a pivotal or rocking connection with plate 16, a rubber cushion 110 being provided to permit this flexing of the bolted type connection. An annular-shaped thrust block 107 is fixedly retained within member 103 by means of peripherally spaced rivets 109. The location of block 107 is substantially midway between the ends of tubular member 103 to provide a thrust surface for bearing 111. Bearing 111 rotatably receives a shaft 113, one end 115 of which is provided with deep helical threads having a relatively steep helical lead and the other end is provided with helical threads 116 adapted to receive a threaded head member 117 which may be retained thereon by having the end of the last-mentioned threaded portion upset at 119.

An inner tubular member 121 is slidably received within tubular member 103 for relative axial movement thereto. It is to be noted that end 123 oppositely disposed from block 105 of the outer tubular member receives a block 125 having an aperture 126 to receive pin 58. Tubular member 121, telescopically received within tubular member 103 and about helically threaded screw shaft 113, terminates in an enlarged portion 127 fixedly receiving nut member 129. Nut 129 is provided with internal helical threads of relatively steep axial lead mating with the helical threads of screw shaft 115 for cooperation therewith. Enlarged end portion 127 has a diameter slightly less than the inside diameter of tubular member 103 and is received thereby in freely sliding relationship. The other end of tubular member 103 which telescopically receives inner tubular member 121 is inturned at 131 and provided with a plastic annular ring 131 to slidably receive inner tubular member 121 therethrough. It is also to be noted that the outer end of screw shaft 115 contains a plastic washer 133 which provides a slidable bearing surface maintaining screw 115 and inner tubular member 121 coaxially aligned. Structure has now been described which will permit coaxial linear movement of member 121 relative to tubular member 103 and screw shaft 115.

Figure 7:
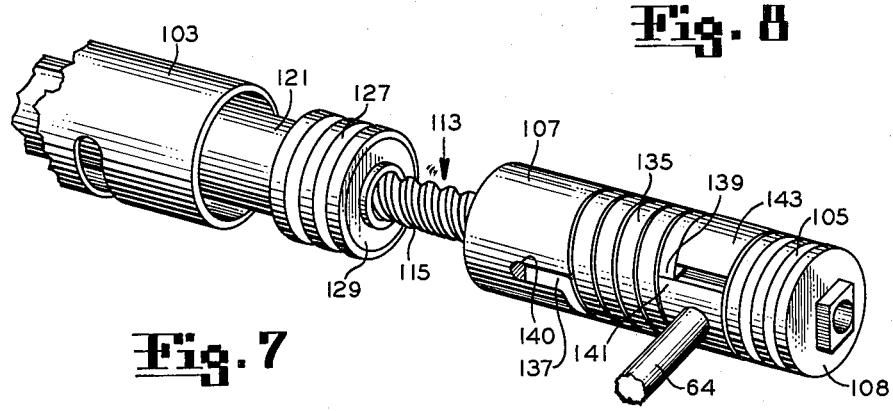
FIGURE 7 is a partially exploded isometric view of the position-holding mechanism.

A helically wound spring clutch 135 surrounds head 117 in normal gripping or holding relation therewith. One portion 137 (FIGURE 7) of coil 135 protrudes axially and is received in slot 140 of thrust block 107. The other end 139 of this coil terminates adjacent shoulder 141 of a clutch release member 143. This latter member is rotatably received on an inwardly extending portion 145 of bearing block 105. Ring means 147 retains clutch release member 143 on the portion 145. A radially extending tap in release member 143 receives arm 64 extending therefrom. This arm is shown in FIGURE 1 wherein it provides handle 62 operative to be pivoted forwardly for release of the helically wound coil 135 from around head 117. The outside diameter of coil 135 is slightly less than the inside diameter of tubular member 110, as noted in FIGURE 6. When it is desired that coil 135 be released from its gripping engagement around the head 117, handle 62, as viewed in FIGURE 1, is moved forward whereupon shoulder 141 engages end 139 of the coil to expand the coil into a position contacting the inside surface of tubular member 103 whereupon release from around the head 117 will be effected. The natural resiliency of coil 135 tends to move handle 62 backward, upon release thereof, and again establish its gripping action on head 117. FIGURE 7 illustrates that coil 135 is right-hand wound and that screw shaft 115 has right-hand threads thereon. Any force tending to move members 103 and 121 to an axial extended position will impart a rotative movement to screw 115 and head 117 which would be moved in a direction that would tend to wrap coil 135 even more tightly about head 117 to prevent any relative rotation therebetween. Movement applied through handle 62 rotating clutch release member 143 enlarges the internal diameter of clutch 135 to release its grip from head 117. In the reverse direction, rotation of head 117 does not enhance the gripping action of coil 135 but, on the contrary, tends to unwrap or expand the coil, thus permitting inward movement of the tubular member 121 upon the application of relatively slight force sufficient to overcome the friction of the internal parts.

Figure 8:
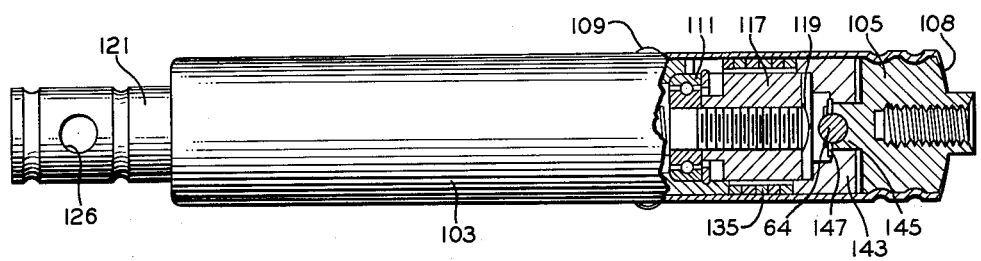
FIGURE 8 is a cross-sectional view of the lower end of the device of FIGURE 6 wherein the release handle has been turned 90 degrees.

FIGURE 8 is the same disclosure as FIGURE 6 but wherein handle 62 and shaft 64 have been rotated 90 degrees to release coil clutch 135 from gripping engagement with head 117.

Stud 58, as above defined, extends through the U-shaped bracket 28 to provide an anchor for one end of the positioning mechanism terminating on the inside in an enlarged head 149 which provides an anchor for the upper end of the coil spring 150. The other end of the coil spring is anchored to an eyebolt 151 in plate 16. Coil spring 150, when located between the anchors just referred to, is in tension and urges the extensible members 103 and 121 to a retracted position regardless of their axial position when the seat back is in the normal position shown in FIGURE 3 or rearwardly thereof. Retraction of extensible members 103 and 121 is resisted by the holding action of coil clutch 135.

Therefore, regardless of the position of back 18, a resilient force is always maintained on the positioning mechanism tending to pull the back to the normal position, so long as the back is not forward of the normal or FIGURE 3 position. This tension is great enough to pull back 18 to such normal position upon manual movement of handle 62 forwardly which releases the holding coil 135. However, it is not sufficiently strong to overcome the internal friction of the working parts and the resilient gripping of the head 117 by the coil 135 in the absence of any external force tending to retract the mechanism such as a person in the back seat of a car pushing forwardly on the back, such an exterior force of even a slight amount being sufficient to quite easily retract the mechanism.

Figure 9:
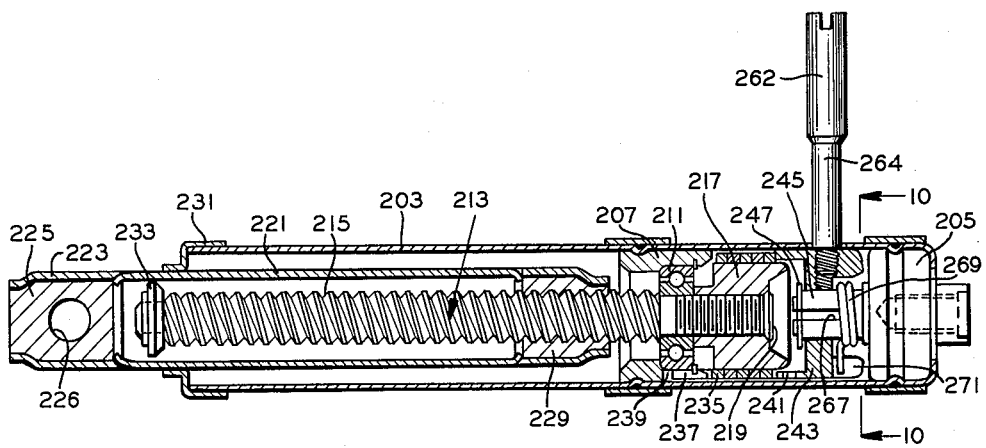
FIGURE 9 is a view similar to FIGURE 6 of another form of position-holding mechanism, but viewed from the opposite side.
Figure 10:
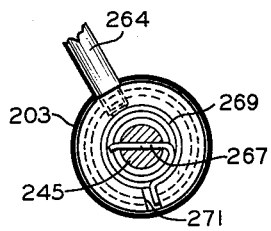
FIGURE 10 is a cross-sectional view taken on line 10—10 of FIGURE 9 and in the direction of the arrows.

Referring now to FIGURES 9 and 10 wherein another form of positioning or holding device is depicted, an outer tubular member 203 is fixedly provided at one end with a block 205 which is tapped to provide means for fastening it to plate 16 of the seat frame. An annular thrust block 207 is fixedly retained within member 203 by means of indentation of the outer tubular member 203 within said thrust block at spaced intervals around the periphery thereof. The member 207 provides a thrust surface for thrust bearing 211. The latter bearing rotatably receives a shaft 213, one end 215 of which is provided with deep helical threads having a relatively steep lead and the other end threadedly receives a head member 217 which is retained thereon by having the end of the shaft suitably upset at 219.

An inner tubular member 221 is axially slidably received within tubular member 203. The end 223 of the member 221 oppositely disposed from block 205 of the outer tubular member is adapted to be nonrotatably received by pin 58 in U-shaped bracket 28 by means of an aperture 226 therein. The end 223 fixedly receives, by means of an outer reduced portion and inner striking, an aperture block 225 to strengthen or reinforce the aperture 226. Tubular member 221, telescopically received within tubular member 203 and about helically threaded screw shaft portion 215, fixedly receives a nut member 229 by means of a reduced outer portion and inner striking. Nut 229 is provided with internal helical threads of relatively steep lead mating with the helical threads of screw shaft portion 215 for cooperation therewith.

The end of the tubular member 203 which receives the inner tubular member 221 is provided with an annular member 231 which provides a sliding bearing surface for the inner tubular member 221. The outer end of the screw shaft 213 is provided with a plastic washer 233 for sliding bearing engagement with the tubular member 221 maintaining a coaxial concentric relation between the screw shaft and latter member in cooperation with the nut member 229. The plastic washer together with the bearing 211 and block 207 keep the screw member axially concentrically aligned with the outer tubular member 203. Structure has now been described which will permit coaxial linear movement of the member 221 relative to tubular member 203 and screw shaft 213.

A helically wound spring clutch 235 surrounds head 217 normally in gripping or holding relation therewith as shown in FIGURE 9. One end portion 237 of coil 235 protrudes axially and is received within a slot 239 of thrust block 207. The other end (not shown) of this coil terminates adjacent shoulder 241 of a clutch release member 243. The latter member is rotatably received on an inwardly, axially extending portion 245 of bearing block 205. Ring means 247 retains the clutch release member on the portion 245, the latter member being supported in coaxial, concentric relation with the outer tubular member 203 by the portion 245. A radially extending slot in tubular member 203 receives arm 264 extending therethrough terminating in a handle 262. The operation of this arm is like that of arm 64 in FIGURE 1, it being pivotable forwardly with release member 243 for release of the helically wound coil 235 from around head 217. The outside diameter of coil 235 is normally considerably less than the inside diameter of tubular member 203, as can be noted in FIGURE 9 by the clearance shown. However, when it is desired that coil 235 be released from its gripping engagement around the head 217, handle 262 is moved completely forwardly, as would be viewed from a showing similar to FIGURE 1, for instance, whereupon shoulder 241 engages the adjacent end of the coil to expand the latter into a position contacting the inside surface of the tubular member 203 whereupon release from around the head 217 is effected. The resiliency of coil 235 causes it to return to its original condition and size upon release of the handle 262 to again establish its gripping action on head 217, the handle tended to be moved rearwardly by the coil return. The coil 235 is right-hand wound and screw portion shaft 215 has right-hand threads thereon. Any force tending to move member 221 to an axially extended position relative to member 203 will impart rotational movement to screw shaft 213 and head 217 which will move in a direction that will cause coil 235 to wrap even more tightly about head 217, the greater the force the greater the wrapping, to prevent any relative rotation therebetween.

Movement of the handle 262 forwardly will, of course, rotate clutch release member 243 and cause enlargement of clutch 235 to release its grip from head 217. Rotation of head 217 in the reverse direction does not enhance the gripping action of coil 235 to produce the tight locking thereof but, on the contrary, tends to unwrap or expand the coil thus permitting inward movement of the tubular member 221 upon the application of a relatively slight force sufficient to overcome the friction of the internal parts.

In the present modified form, the inwardly extending portion 245 of the block 205 is centrally divided at 267. A coil spring 269 is received on this extended portion, one end of which spring is contained within the central opening of the portion 245, the other end of the spring being received within a slot 271 in the clutch release member 243. The spring member 269 constitutes a means for effecting a positive return of the handle 262 to the normal, or unactuated rearward position thereof, when released by a person in case the resilient clutch member 235 does not move the handle all the way back to this position.

As in the case of the previous form, therefore, when the present device is in the normal or unactuated condition shown in FIGURES 9 and 10, extension of the same, that is, movement of the inner tubular member 221 further outwardly within the outer tubular member 203 is prevented, while retraction of the device or reverse movement of the inner tubular member relative to the outer member is permitted with only a minimum force being applied which is not resisted in any appreciable way. Movement of the handle 262 forwardly, on the other hand, permits free extension as well as contraction of the device with no resistance by the internal mechanism.

It is also important to point out and emphasize that the device of FIGURES 6 through 8 and that of FIGURES 9 and 10 together with the coil spring 150 are so interconnected between the base portion 16 and frame 20 as to be effective or function only when the seat back is in the normal position shown in FIGURE 2 or rearward thereof, while not being effective or functioning when the seat back is forward of the normal position. This is, of course, by virtue of the coil spring 150 and positioning or holding devices being connected to the pivot pin 58 which functions as a pivot point when the back swings forwardly of the normal position. The reason for this manner of operation is obvious. It is only when the seat back is in the normal position or rearwardly thereof that a person's weight is on the same and it is necessary to support such weight. When a person desires to enter or leave the rear seat portion of a two-door automobile, free or unrestricted movement of the seat back between the normal and forward positions in both directions is desired without the need of first locating and then moving any handle or releasing and resetting any mechanism.

Although the pivot pin 58 engages the bracket 14 when the pin is effective as a pivot means forwardly and below the position of the bolt 44 when serving as a pivot means, such a pin as 58 could also engage a bracket such as 14, when such a pin is effective as a pivot means above and rearwardly of the bolt 44 when serving as a pivot means should such a bracket be employed on the inner side of the seat back nearest the center of the automobile rather than on the outer side nearest the door as in the case of the disclosed bracket 14 and also produce the desired inward tilt of the seat back towards the center of the car as the back swings forwardly of the normal position. It is also pointed out that the pin 58 could engage a bracket such as 14 when the pin is effective as a pivot means vertically below or horizontally forward of the bolt 44 when serving as a pivot means and produce inward tilting of the seat back, but it is preferable as being more effective to have the pin 58 both forward and below the bolt 44 as shown in FIGURES 2 and 3 of the drawing. Further, although the pivot 26 is fixed, a second bracket somewhat like 14 could be used, in addition to the bracket 14 on the other side of the seat, with which a second pivot pin, similar to pin 58, could engage and come into play as the pivot means when the seat back is moved forwardly of the normal position to shift the pivot point on the inner side of the seat back vertically above, horizontally rearwardly, or both above and rearwardly of the pivot means, the equivalent of bolt 44, which is effective when the seat back moves between the normal and rearward positions and when so acting as a pivot means whereby to cause the pivot on both sides of the seat back to shift in a proper direction to produce a more pronounced inward tilting of the back when moving forward of the normal position.

It is also pointed out that when the position-holding device 100 or the modified device of FIGURES 9 and 10 is employed on the outer or door side of the driver's seat back, left-hand rather than right-hand threading of the screw shafts 113 and 213 and nut members 129 and 229 will be employed and also a left-hand wound rather than a right-hand wound spring clutch 135 or 235.

Such words as "vertically," "below," and "forward" appearing in the specification and claims are relative to the position of the construction shown in FIGURES 1 to 4 of the drawing only and are not to be taken in an absolute sense, it being understood of course that the vehicle, for instance, on which the seat back is mounted may or may not be on level ground.

As has been described in the above part of the specification, a right-hand helical thread and coil clutch provides a mechanism 100 which locks in tension, but which will permit override in compression. The same is true for left-hand threads and a left-hand coil clutch. Whenever the helical threads and coil clutch are of a different hand, the mechanism 100 locks in compression, but will permit a slight force to extend it axially. In the present disclosure, right-hand threads and coils have been used.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:
1. An extensible and contractible load-resistable device comprising a first portion, a second portion rectilinearly movable relative to the first portion, a third portion held against any substantial axial movement relative to said first portion and rotatable in either direction relative to the latter portion, said third portion having threading and said second portion having means engaging the threading, said threading and means engaging the threading being constructed to cause rotation of said third portion in one direction upon force being applied to said second portion in one rectilinear direction and rotation of said third portion in the other direction upon force being applied to said second portion in the opposite rectilinear direction, resilient means associated with said first portion and normally engaging said third portion and being effective to prevent substantial rotation of the latter relative to the first portion in one direction while permitting rotation of the third portion in the opposite direction, and means for causing the latter resilient means to permit rotation of the third portion in either direction.

2. The subject matter of claim 1, said resilient means comprising spring means extending at least substantially around and normally grippingly engaging a portion of said third portion, said spring means having a portion associated with said first portion so as to prevent any substantial rotation of said spring means portion in either direction relative to said first portion, said means for causing said resilient means to permit rotation of the third portion in either direction comprising means engageable with another portion of said spring means to cause at least slight expansion of said spring means whereby to permit said rotation of the third portion in either direction.

3. The subject matter of claim 2, said spring means comprising a spring member having a pair of opposite ends and extending around said third portion more than once.

References Cited in the file of this patent
UNITED STATES PATENTS

| | | |
|---|---|---|
| 1,793,045 | Bitzenburger | Feb. 17, 1931 |
| 2,132,729 | Galamb | Oct. 11, 1938 |
| 2,579,305 | Cushman | Dec. 18, 1951 |
| 2,627,894 | Herider | Feb. 10, 1953 |
| 3,046,055 | Martens | July 24, 1962 |